July 1, 1941.  S. M. ROWE  2,247,561
APPARATUS FOR CASTING
Filed April 21, 1939   4 Sheets-Sheet 1

INVENTOR
SIDNEY M. ROWE
BY
John Mahoney
ATTORNEY

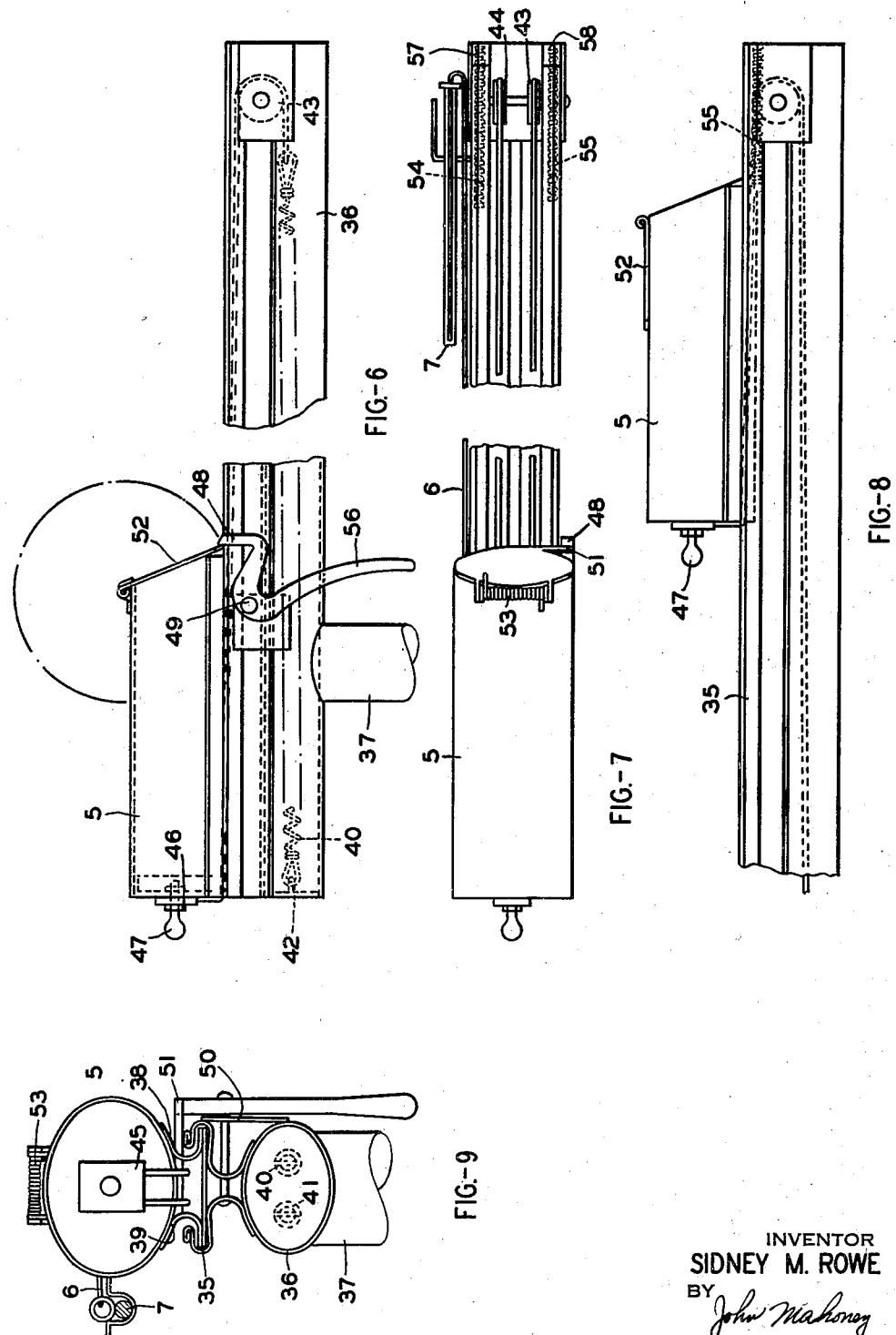

July 1, 1941.  S. M. ROWE  2,247,561
APPARATUS FOR CASTING
Filed April 21, 1939  4 Sheets-Sheet 3

INVENTOR
SIDNEY M. ROWE
BY
*John Mahoney*
ATTORNEY

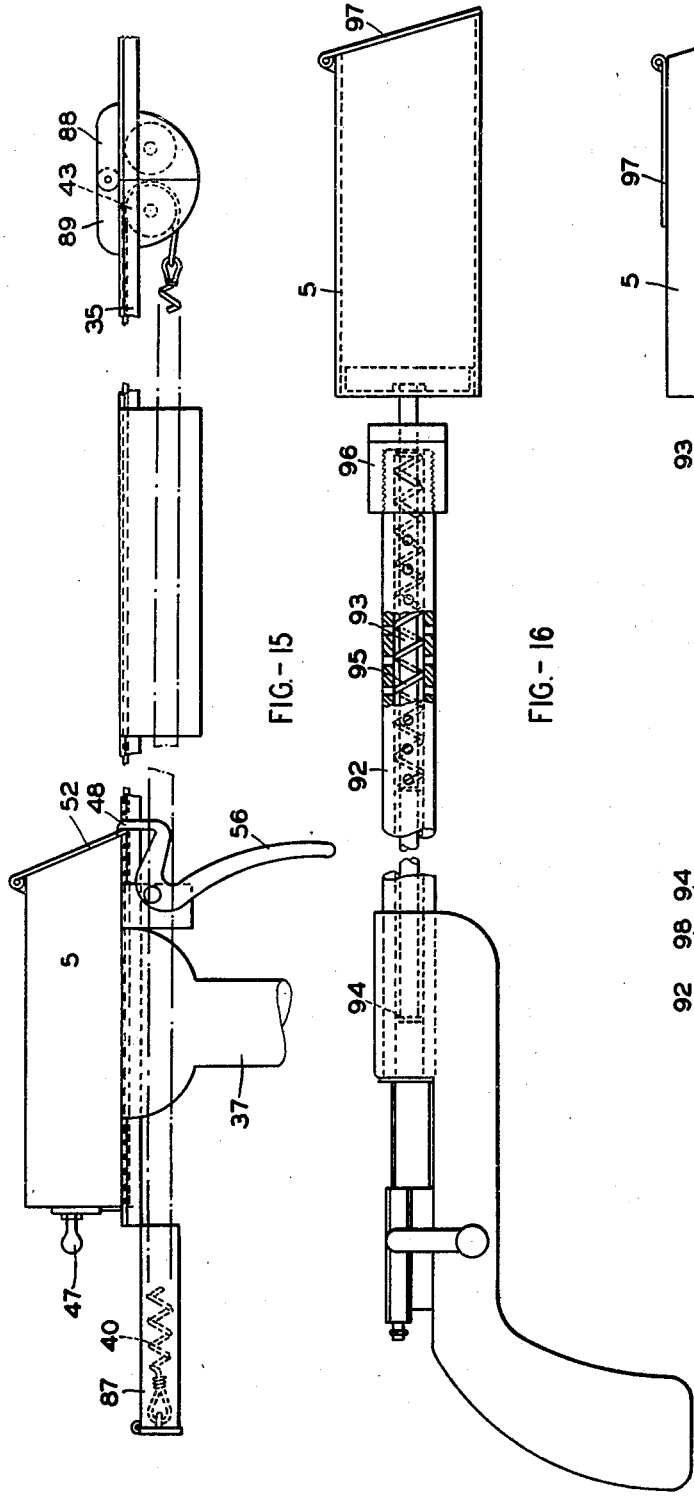

Patented July 1, 1941

2,247,561

UNITED STATES PATENT OFFICE 2,247,561

APPARATUS FOR CASTING

Sidney M. Rowe, Montgomery, Ala., assignor of forty per cent to Floyd H. Mooneyham, Montgomery, Ala.

Application April 21, 1939, Serial No. 269,222

16 Claims. (Cl. 43—19)

My invention relates to apparatus for casting articles, such as bait, and more particularly to means whereby the bait attached to one end of a fishing line may be hurled a satisfactory distance from the operator into a body of water.

As is well known to those skilled in the art, equipment utilized by fishermen who fish mainly for recreative purposes, is the usual rod containing a reel and a line, one end of the line being attached to the reel and the other end being provided with a hook which is attached to the bait.

To obtain the greatest enjoyment from such sport, however, it is necessary to be able to cast the bait a considerable distance into a body of water, such as a lake or stream, to provide a long lineal path for reeling the bait inwardly toward the operator. Many people, however, are not sufficiently skilled in the casting operation to enable them to fully enjoy the sport and they consequently soon become discouraged and abandon this healthful and enjoyable recreation.

It is the aim of the present invention to provide an improved method of casting bait, by means of which the bait may be positively cast to any desired distance into a body of water, such as a lake or stream and which may be utilized by the novice as well as by those who are adept in the art of casting.

Another object of my invention is to provide an improved apparatus for casting bait by means of which sufficient force may be applied to the bait to hurl it rapidly from a container.

A further object of my invention is to provide apparatus for casting bait, including a container for the bait provided with a cover which is normally maintained in open position, said container being associated with the resilient means in such a manner that when the container is in one position the resilient means is stressed and the cover is closed, and upon release of the container the cover automatically opens and the container moves with sufficient rapidity to hurl the bait therefrom.

Another object of my invention is to provide an apparatus for casting bait by means of which the bait is hurled from a container by the release of tension on a resilient member, the container being suddenly stopped to cause the bait to be hurled therefrom.

Other objects and advantages of my invention will be apparent as the specification proceeds.

My invention will be better understood by reference to the accompanying drawings, in which:

Fig. 6 is a side elevational view of another form of my invention, parts of the track and the underlying structure being shown broken away;

Fig. 7 is a plan view of the apparatus shown in Fig. 6;

Fig. 8 is a view similar to Fig. 6, showing the container in a different position;

Fig. 9 is an end view of the apparatus shown in Fig. 6;

Fig. 15 is a side elevational view of apparatus similar to that disclosed in Fig. 6 but showing the track extended;

Fig. 16 is a side elevational view of another modification of my invention; and

Fig. 17 is a view similar to Fig. 16, showing the movable parts in different positions, a portion of the tube being broken away and another portion being shown in section.

As previously stated, the principal purpose of my invention is to provide an improved method and means for casting bait to the desired distance in a body of water, such as a lake or stream. While various forms of apparatus are disclosed for this purpose, they all embody the general principle of pulling a container which holds the bait in one direction against the action of a resilient member, and then releasing the container to expel bait attached to one end of a fishing line outwardly into a body of water.

Figure 1:
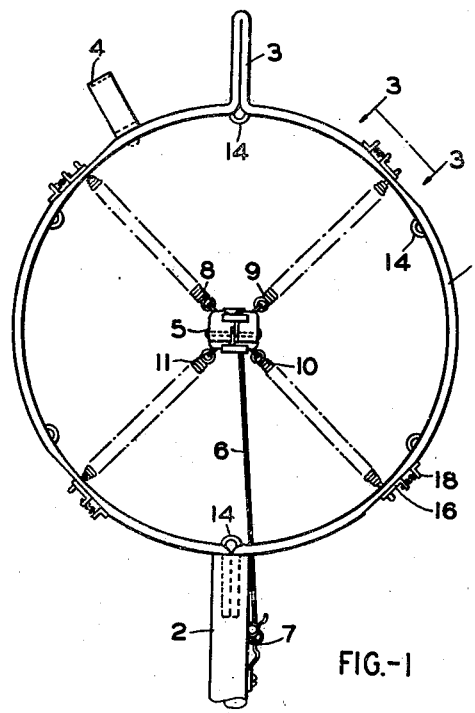
Fig. 1 is a front elevational view of one form of my invention.
Figure 2:
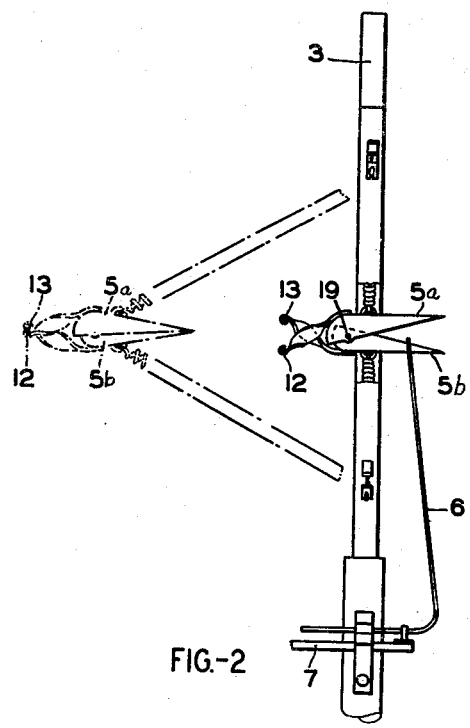
Fig. 2 is a side elevational view of the apparatus shown in Fig. 1, and also showing in dotted lines the springs extended and the container in closed position.
Figure 3:
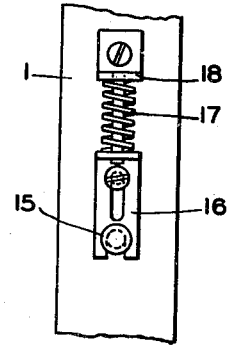
Fig. 3 is a view looking in the direction of line 3—3 in Fig. 1.
Figure 10:
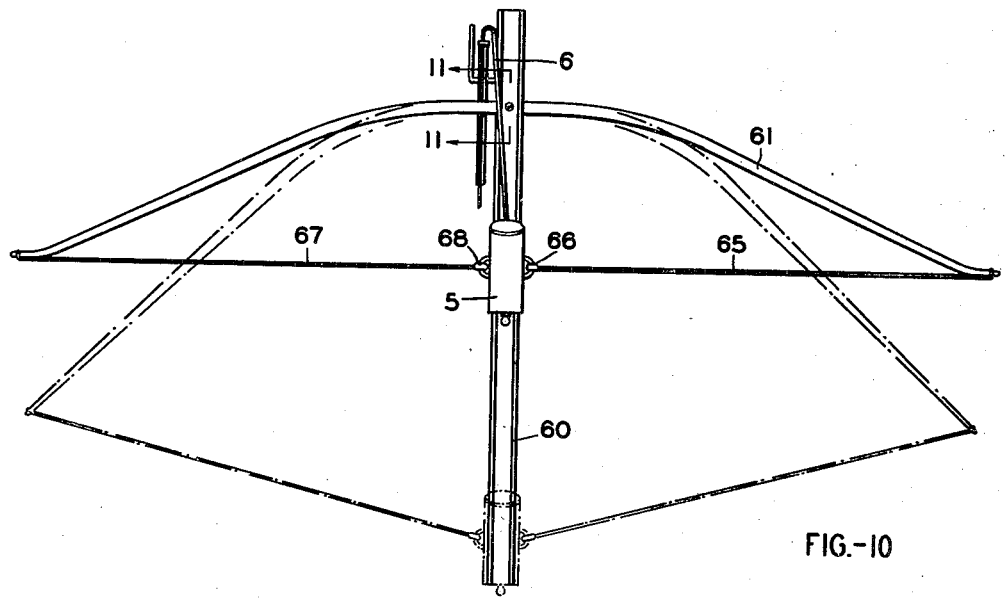
Fig. 10 is a plan view of another form of my invention.
Figure 11:
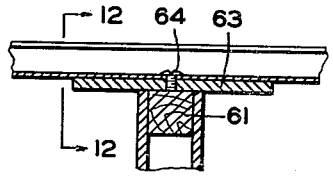
Fig. 11 is a cross-sectional view on the line 11—11 of Fig. 10.
Figure 13:
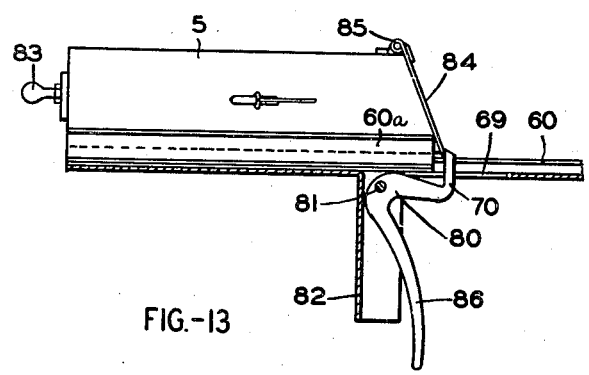
Fig. 13 is an enlarged view of the container shown in Fig. 10 in the position it occupies when the bow is flexed, and showing means for holding the container against the resilient action of the bow.
Figure 12:
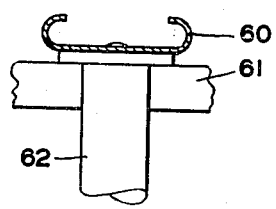
Fig. 12 is a cross-sectional view on the line 12—12 of Fig. 11.
Figure 14:
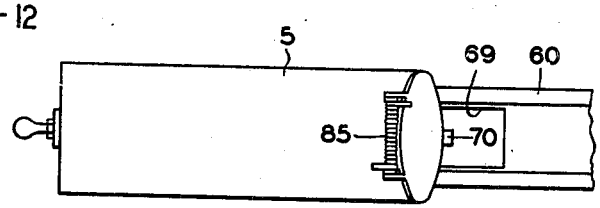
Fig. 14 is a plan view of the apparatus shown in Fig. 13.

One form of apparatus for accomplishing the desired result is shown in Figs. 1 to 3 of the drawings, in which the numeral 1 designates a support mounted upon a holder 2 provided with a handle 3 and a wrist support 4. The holder 2 may be attached to a boat or wharf or other suitable fixture, by any desired means. Associated with support 1 is a container 5 which is adapted to contain bait attached to the end of a line 6, the other end of the line being attached to a reel, not shown, the reel in turn being attached to a rod 7.

According to my invention means are provided to hurl the bait attached to the end of the line 6, outwardly into a body of water, such as a lake or stream. For this purpose a plurality of resilient members 8, 9, 10 and 11, are provided, one end of each of the resilient members being secured to the support and the other end being secured to a portion of the container. As shown in the drawings, resilient members 8 and 9 are secured to the upper part 5a of the container 5 and resilient members 10 and 11 are secured to the bottom part 5b of the container, the parts of the container being pivotally mounted together by means of a pintle 19. The resilient members 8 and 9 acting in opposite directions to resilient members 10 and 11, hold the parts of the container in open position, as shown in full lines in Fig. 2 of the drawings. To close the container and provide a force by means of which the bait may be hurled from the container into the body of water, the upper portion of the container is provided with a handle 12 and the lower portion is provided with a handle 13. When one hand is placed upon the handle 3 utilizing the support 4 for the wrist, and the other hand placed upon handles 12 and 13, the container may be closed and sufficient force applied against the action of resilient members 8, 9, 10 and 11, to impel the container with considerable force when the container is released. The position of the container just before it is released is shown in dotted lines in Fig. 2 of the drawings. Upon release of the container the resilient members automatically open the parts of the container and the bait is hurled outwardly therefrom.

The apparatus disclosed in Figs 1 to 3 may also be utilized as a landing net. For this purpose the support 1 is provided with attaching means, such as a plurality of staples 14, arranged in spaced relationship to each other and the resilient members 8, 9, 10 and 11 are adapted to be removed from the support. To facilitate this operation, one end of each resilient member extends through the support and is provided with a head 15 which is engaged by a notch in one end of an angle iron 16. The notch in angle iron 16 is maintained in engagement with the head 15 by means of a spring 17, one end of which abuts angle iron 16 and the other end of which abuts an angle iron 18 spaced from angle iron 16. Upon applying pressure to angle iron 16 it will be seen that the resilient members may be readily removed from support 1.

Figure 4:
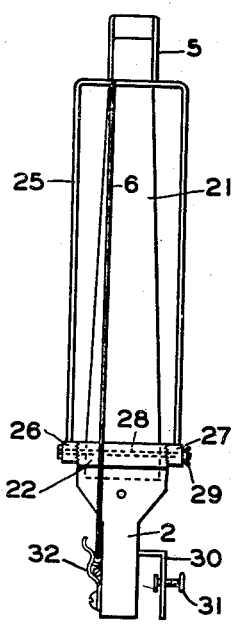
Fig. 4 is a front elevational view of another form of my invention.
Figure 5:
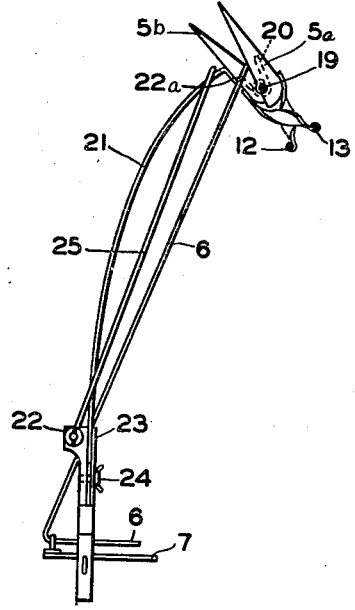
Fig. 5 is a side elevational view of the apparatus shown in Fig. 4.

A modification of my invention is shown in Figs. 4 and 5. In this modification a container having parts 5a and 5b pivotally mounted together as at 19 and constructed similarly to the container shown in Figs. 1 and 2, is provided. The parts of the container may be held in normally open position by any convenient means, such as by a spring 20 and the container is adapted to be closed and the bait hurled therefrom as in the previous example. For this purpose a resilient member 21 is provided, one end of which is attached between parts 22 and 23 of a support, such as a vise, the parts of the vise being held together by any suitable means, such as a bolt 24. The other end of the resilient member 21 is welded or otherwise attached to the lower part 5b of the container, as indicated by the numeral 22a.

In this form of the apparatus means are provided to limit the movement of the container and absorb the shock after the resilient member has been stressed and the container released. For this purpose a cushioning frame 25 is provided which is of a substantially rectangular form and the opposite ends of which are attached to pinions 26 and 27. The pinions 26 and 27 are adapted to mesh with teeth formed upon opposite ends of part 22 of the vise and are held in engagement therewith by means of a rod 28 provided with a nut 29. Upon release of nut 29 the pinions upon cushioning frame 25 may be moved to position frame 25 at any desired angle and the nut 29 may be then secured in place.

In this modification the holder 2 is provided with an angle iron 30 and a clamp 31 by means of which the apparatus may be attached to a desired fixture, such as a boat or a wharf, and if desired the same or equivalent means may be provided for attaching the holder shown in Figs. 1 and 2 to a desired fixture.

Line 6 and rod 7 are supported on the holder 2 by any convenient means, such as a corrugated sheath 32, and the line, to one end of which the bait is attached, extends into the container 5. Upon exerting pressure upon handles 12 and 13 the container is closed, and upon stressing resilient member 21 and then releasing the container, the parts of the container automatically open and the container is forced with considerable rapidity until the resilient member 21 strikes cushioning frame 25, whereupon the bait attached to the line 6 will be hurled from the container outwardly to the desired distance into the body of water.

A further modification of my invention is shown in Figs. 6 to 9 inclusive. In this modification means are provided for positively retaining the bait container 5 under tension, such means also being effective in retaining the cover of the bait container in closed position. Shock absorbing means are also provided to prevent damage to the container when it is suddenly stopped.

For this purpose a track 35 is provided which is mounted upon a support 36, the support being provided with a holder 37 which may be attached to any suitable fixture, such as a boat or wharf, by any convenient means, such as the one described, and the container is provided with rigid straps 38 and 39 which extend into grooves on the track. As shown, resilient means, such as springs 40 and 41, are provided for moving the container along the track. One end of spring 40 is attached to a lug 42 extending inwardly from the end of support 36, and the other end is passed around a pulley 43 and is secured to the container by any suitable means, such as a plate 45 which in turn is held in engagement with the container by means of a shoulder 46 on handle 47 attached to the end of the container. In a like manner spring 41 is attached to a similar lug and is passed around pulley 44 and secured to the container by plate 45. For placing tension upon the springs, the container is moved to one end of the track, as shown in Fig. 6, by means of handle 47.

Means are also provided to retain the container in this position. While any suitable means may be employed, as illustrated a pawl 48 is pivotally mounted on a rod 49 which extends through a plate 50 and track 35. In the position shown in Fig. 6, pawl 48 engages a bar 51 attached to the front of the container to maintain the container in position against the resilient action of springs 40 and 41. Pawl 48 also maintains the cover 52 of the container in closed position against the resilient action of the spring 53 which tends to urge cover 52 to open position. For absorbing the shock incident to the sudden stopping of the container, suitable resilient means 54 and 55 are provided, which as shown may be conveniently arranged in the grooves of the track and held in position by an extension on the track, as indicated by numerals 57 and 58.

The operation of the apparatus shown in this modification will now be apparent. The line 6 containing the bait is placed in container 5 and the container is moved against the tension of springs 40 and 41 to the position shown in Fig. 6. The cover 52 of the container is then closed and pawl 48 serves to hold the container in the desired position and also serves to hold the cover in closed position. Upon applying pressure to handle 56 of pawl 48, container 5 is released. Spring 53 then becomes effective in opening the cover and the container is propelled rapidly forwardly, throwing the bait therefrom. The resilient means 54 and 55 serve to stop the container and absorb the shock resulting from the sudden stoppage, as illustrated in Fig. 8 of the drawings.

Another modification of my invention is shown in Figs. 10 to 14 of the drawings. This modification shows another means for placing tension upon a resilient means which propels the container with sufficient force to hurl the bait therefrom.

As shown in the drawings a track 60 is provided, the container being provided with rigid straps 60a similar to those shown in Fig. 9 of the drawings.

As illustrated, a bow 61 is provided, which passes through an opening in a holder 62, which holder is secured in any desired manner, such as by welding, to a plate 63 which in turn is fastened to the lower surface of track 60 by any suitable means, such as a bolt or screw 64. One end of bow 61 is provided with a cord or wire 65 which is attached at 66 to one side of the container. In a like manner the other end of the bow is provided with a wire or cord 67 which is attached to the opposite side of the container as indicated by numeral 68. Adjacent to one end thereof the lower portion of the track is provided with an opening 69 adapted to receive the end 70 of a pawl 80 pivotally secured by suitable means, such as a pintle 81, to a downwardly extending bracket 82.

In the operation of this form of the invention the end of line 6 having the bait attached thereto is placed within container 5 and the container is moved by handle 83 to the end of the track opposite to that at which the bow is affixed, thereby flexing the bow, and the container is held in position by means of pawl 80 thereby maintaining the bow in flexed position. The pawl also holds the cover 84 of container 5 in closed position against the resilient action of spring 85. Upon actuating handle 86 of pawl 80, container 5 is released, spring 85 opens cover 84 and the resilient action of bow 61 throws the bait from the container to the desired distance in the body of water.

Another modification of my invention which is somewhat similar to that shown in Figs. 6 to 9 inclusive, is disclosed in Fig. 15. The parts have accordingly been designated by the same reference numbers. In this modification, however, the springs 40 and 41 extend into a projection 87 beyond the end of the track. The track 35 is also extended beyond pulleys 43 and 44 by any suitable means such as a bracket 88 which is pivotally secured to a bracket 89 affixed to track 35. The operation of the apparatus shown in Fig. 15 is similar to that shown in Fig. 6, with the exception that instead of utilizing shock absorbers to cause a sudden stoppage of the container, the container is permitted to continue its course along the track until stopped by the tension of springs 40 and 41.

Another modification of my invention is shown in Figs. 16 and 17 of the drawings. In this modification a tubular member or barrel 92 is provided, into one end of which a rod 93 extends which is provided with a head 94 at one end, and the other end of which is attached to container 5. Resilient means 95 are coiled about the rod, one end of the resilient means abutting against head 94 of the rod and the other end abutting against one end of a cap 96 removably mounted upon one end of barrel 92 and provided with an aperture through which one end of rod 93 extends. In the operation of the apparatus shown in this modification, means are provided upon the barrel 92 for holding the rod and fishing line, similar to that disclosed in previous modifications, and the end of the fishing line to which the bait is attached is placed in container 5. A fluid under pressure is then forced into the opposite end of the tube, forcing rod 93 inwardly against the tension of spring 95. The sudden forward movement of container 5 opens cover 97 and throws the bait outwardly into the body of water. While any means may be utilized for propelling fluid pressure into the end of barrel 92, a pistol or revolver containing a blank cartridge, an air pressure gun or any suitable means of liquid or air pressure may be employed. For relieving the air pressure when the container has reached the end of its travel, barrel 92 is provided with openings or apertures 98.

As will be noted, the cap 96 may be removed from barrel 92 and rod 93 and spring 95 withdrawn from the barrel, in which case a regular cartridge can be inserted in gun 99 which may then be utilized for any desired purpose. Or, if desired, a harpoon having a washer thereon may be inserted in barrel 92 and the apparatus utilized for harpooning large fish.

While I have described my apparatus as being particularly adapted for casting bait, it will be understood that it may be employed for other purposes. For instance, it may be utilized in propelling toys, such as balloons or airplanes or the like, or may even be utilized for hurling hand grenades or other missiles.

What I claim is:

1. Apparatus of the class described comprising a support, a container for bait, a rod including a fishing line, said fishing line having one end attached to said rod and the other end attached to said bait, means for holding said rod on said support, resilient means having one end attached to said support and the other end attached to said container, said container being adapted to be moved against the tension of said resilient means to provide a potential force which hurls the bait from said container upon release of the container.

2. Apparatus of the class described comprising a support, a container for bait adapted to be attached to one end of a fishing line, a cover for said container, means for normally holding said cover in open position, resilient means attached to said container and said support, said container being provided with handles which are adapted to close the container as force is applied to said container to place tension upon said resilient means, and said cover being adapted to open when the force is released to hurl the bait from the container.

3. Apparatus of the class described, comprising a substantially annular support, a container for bait having parts movable to open and close said container, a plurality of resilient members removably attached to said support and said container in a manner to hold the container in open position, said container being adapted to be moved against the tension of said resilient members with a force which closes said container and places sufficient tension on said resilient members to cause said container to be propelled with sufficient force to hurl the bait from the container when the container is released and automatically opened.

4. Apparatus of the class described comprising a support, a container for bait having upper and lower interfitting parts pivotally mounted together, upper and lower resilient means, the upper resilient means having one of its ends attached to said support and its other end attached to the upper part of said container and the lower resilient means having one end attached to said support and the other end attached to the lower part of said container, said resilient means being adapted to maintain said cover in normally open position and said container being provided with handles, one of which is attached to the upper part of said container and the other of which is attached to the lower part of said container, whereby said container is closed when force is applied upon said container to place tension upon said resilient means, said resilient means being adapted to open said container and hurl the bait therefrom when the tension upon said resilient means is released.

5. Apparatus of the class described comprising a support, a container for bait having upper and lower parts pivotally secured together, each of said parts being provided with a handle, a plurality of springs attached to the upper part of said container and removably attached to the upper part of said support, a plurality of lower springs attached to the lower portion of said container and removably attached to the lower portion of said support, said spring means being adapted to normally hold said cover in open position and said handles being arranged so that pressure may be applied to close said container while simultaneously placing tension upon said springs, said springs being adapted upon the release of tension thereon to open said cover and hurl the bait from said container.

6. Apparatus of the class described comprising a support, a container having upper and lower interfitting parts pivotally secured together and each part being provided with a handle, spring means attached to the upper part of said support and to the upper part of said container, spring means attached to the lower part of said container and the lower part of said support, said spring means being adapted to hold said container in open position, a fishing rod having a line attached thereto mounted on said support, one end of said line having bait attached thereto which is adapted to be placed in said container, said container being adapted to be closed by forcing said handles in opposite directions when tension is placed upon said spring means, the release of tension upon said spring means being effective in opening said container and hurling the bait, together with the end of the line, from the container.

7. Apparatus of the class described comprising a support, a container having upper and lower interfitting parts, each of which has a handle thereon, means for holding the container in open position, spring means attached to said support and said container, said container being adapted to be closed by exerting force upon said handles and applying tension to said spring means, and a frame attached to said support to limit the movement of the spring means when the force upon said container is released.

8. Apparatus of the class described comprising a support, a container having upper and lower interfitting parts, each of which has a handle thereon, means for holding the container in open position, spring means attached to said support and said container, said container being adapted to be closed by exerting force upon said handles and applying tension to said spring, and an adjustable frame attached to said support to limit the movement of the spring means when the force upon said container is released.

9. Apparatus of the class described comprising a support, a container for bait movably mounted on said support, spring means attached to said container and said support, a closure for said container adapted to be normally maintained in open position, means attached to said support for holding said cover in closed position and said container in a position to place tension on said spring means, and means whereby said holding means may be released to cause the container closure to open and move said container with sufficient force to hurl the bait from said container.

10. Apparatus of the class described comprising a track, a support for said track, a container for bait adapted to slide along said track, spring means having one end attached to said support and the other end attached to said container, said container being adapted to be moved to one end of said track to place tension on said spring means, means for holding said container against the tension of said spring, shock-absorbing means associated with the other end of said track and means whereby said container may be released, there being sufficient tension in said spring means when the container is released to force the container rapidly along said track and into contact with said shock-absorbing means, the sudden impedance of the travel of said container being sufficient to throw the bait from said container.

11. Apparatus of the class described comprising a support, a movable container for bait, a rod including a fishing line having one end attached to said rod and the other end attached to said bait, means for holding said rod on said support, resilient means associated with said container and said support, and means responsive to the movement of said container for stressing said resilient means, said container being adapted to be moved rapidly in the opposite direction when the stress upon said resilient member is released.

12. Apparatus of the class described comprising a support, a movable container having a cover associated with said support, resilient means associated with said container and said support, means responsive to the movement of said container for stressing said resilient means, and means whereby said cover may be maintained in closed position when the resilient means is under stress, said container being adapted to be moved rapidly in the opposite direction and the cover released when the stress upon said resilient means is released.

13. Apparatus of the class described comprising a support, a movable container for bait having a cover therefor, resilient means having one end attached to said container and the other end attached to said support, said container being adapted to be moved in a substantially horizontal direction to place tension upon said resilient means and said cover being maintained in closed position when said resilient means is under stress and the release of said container being adapted to open said cover and hurl the bait therefrom.

14. Apparatus of the class described comprising a track having grooves at the opposite sides thereof, a container for bait, means secured to said container and slidably mounted in the grooves on said track, spring means attached to said container and said support, means for holding said container in a position in which tension is placed on said spring means, and means whereby said container may be released to exert sufficient force upon the container to hurl the bait therefrom.

15. Apparatus of the class described comprising a support, a container provided with handles and having upper and lower interfitting parts which are normally maintained in open position, resilient means attached to said support and said container, said container being adapted to be closed by exerting force upon said handles and applying tension to said resilient means, and said parts being adapted to open when the force upon said handles and resilient means is released.

16. Apparatus of the class described comprising a support, a container movably mounted on said support, spring means attached to said container and said support, a closure for said container adapted to be normally maintained in open position, means attached to said support for holding said closure in closed position and said container in a position to place tension on said spring means, and means whereby said holding means may be released to cause said closure to open and said spring means to move said container.

SIDNEY M. ROWE.